United States Patent
Kessler et al.

(10) Patent No.: US 9,739,199 B2
(45) Date of Patent: Aug. 22, 2017

(54) INTERCOOLED GAS TURBINE OPTIMIZATION

(71) Applicant: General Electric Company, Schenectady, NY (US)

(72) Inventors: Daniel Aaron Kessler, Houston, TX (US); Christopher Hung Vu, Houston, TX (US); Veronica Elizabeth Vela, Queretaro (MX)

(73) Assignee: General Electric Company, Schenectady, NY (US)

( * ) Notice: Subject to any disclaimer, the term of this patent is extended or adjusted under 35 U.S.C. 154(b) by 12 days.

(21) Appl. No.: 14/928,560

(22) Filed: Oct. 30, 2015

(65) Prior Publication Data
US 2017/0122208 A1    May 4, 2017

(51) Int. Cl.
G06G 7/64 (2006.01)
F02C 7/143 (2006.01)
F02C 9/18 (2006.01)

(52) U.S. Cl.
CPC ............... *F02C 7/143* (2013.01); *F02C 9/18* (2013.01); *F05D 2220/32* (2013.01); *F05D 2260/211* (2013.01); *F05D 2270/112* (2013.01); *F05D 2270/303* (2013.01); *F05D 2270/54* (2013.01)

(58) Field of Classification Search
CPC ........ F02C 7/143; F02C 9/18; F05D 2220/32; F05D 2260/211; F05D 2270/112; F05D 2270/303; F05D 2270/54
See application file for complete search history.

(56) References Cited

U.S. PATENT DOCUMENTS

| | | | |
|---|---|---|---|
| 6,604,515 B2 | 8/2003 | Marsh et al. | |
| 7,254,950 B2 | 8/2007 | Joshi et al. | |
| 8,931,440 B2 | 1/2015 | Mahrs et al. | |
| 9,003,764 B2 | 4/2015 | Thacker et al. | |
| 9,297,315 B2 * | 3/2016 | Simons | F02C 9/00 |
| 2004/0055273 A1* | 3/2004 | Hirayama | F02C 9/28 60/39.281 |
| 2005/0022536 A1* | 2/2005 | Dovali-Solis | F02C 3/30 60/772 |
| 2009/0211252 A1* | 8/2009 | Tani | F01K 7/345 60/645 |
| 2010/0024536 A1* | 2/2010 | Adibhatla | G05B 23/0221 73/112.01 |
| 2010/0319356 A1* | 12/2010 | Takeda | F02C 6/00 60/773 |

(Continued)

FOREIGN PATENT DOCUMENTS

| | | | |
|---|---|---|---|
| JP | 09032510 A | * | 2/1997 |
| JP | 09250362 A | * | 9/1997 |
| JP | 2011144742 A | * | 7/2011 |

*Primary Examiner* — Tuan C. To
(74) *Attorney, Agent, or Firm* — Fletcher Yoder P.C.

(57) ABSTRACT

A control system for a gas turbine includes a controller. The controller includes a processor configured to access an operational parameter associated with the gas turbine. The processor is configured to calculate a bias based on the operational parameter, wherein the bias indicates an amount of change in a temperature of an oxidant entering a compressor of the turbine to reach a reference temperature. The processor is further configured to control the temperature of the oxidant based on the bias to improve power output of the gas turbine.

20 Claims, 3 Drawing Sheets

(56) References Cited

U.S. PATENT DOCUMENTS

| | | | |
|---|---|---|---|
| 2013/0192249 A1* | 8/2013 | Widener | F02C 7/232 60/782 |
| 2015/0244007 A1* | 8/2015 | Nakamoto | H01M 8/04395 429/446 |
| 2015/0308293 A1* | 10/2015 | Huntington | F02C 3/34 60/772 |
| 2015/0308353 A1* | 10/2015 | Gardner | F01D 17/162 60/773 |
| 2016/0123214 A1* | 5/2016 | Kim | F01P 5/12 60/605.1 |
| 2016/0131016 A1* | 5/2016 | Mehravaran | F01P 5/12 123/41.1 |
| 2016/0138531 A1* | 5/2016 | Lee | F02M 26/29 123/568.12 |
| 2016/0169095 A1* | 6/2016 | Kim | F01N 13/107 60/603 |
| 2016/0245125 A1* | 8/2016 | Watkins | F01K 11/02 |
| 2016/0258327 A1* | 9/2016 | Klosinski | F01K 23/10 |
| 2016/0265458 A1* | 9/2016 | Okada | F02D 41/0065 |
| 2016/0281604 A1* | 9/2016 | Freund | F02C 7/143 |
| 2016/0363070 A1* | 12/2016 | Hotta | F01N 3/2066 |
| 2017/0009642 A1* | 1/2017 | Kurtz | F02B 29/0493 |
| 2017/0009687 A1* | 1/2017 | Yamano | F02P 5/153 |
| 2017/0016389 A1* | 1/2017 | Xiao | F02B 37/14 |
| 2017/0074181 A1* | 3/2017 | Goto | F02D 41/0235 |
| 2017/0082051 A1* | 3/2017 | Hoshika | F02D 41/18 |

* cited by examiner

INTERCOOLED GAS TURBINE OPTIMIZATION

BACKGROUND

The subject matter disclosed herein relates to gas turbines, and more particularly, to controlling temperature of an oxidant entering a compressor of a gas turbine.

Frequently in power generation, turbines generate rotational energy by using fuel and an oxidant. For example, a gas turbine engine may be used to provide rotational energy to power a vehicle, industrial equipment, or a generator to generate electricity to a power grid. The gas turbine may use one or more compressors to provide a compressed oxidant (e.g., air, oxygen, oxygen-enriched air, or oxygen-reduced air) that is combined with a fuel and combusted to rotate blades of the turbine to produce the rotational energy. Gas turbines may include an intercooler to cool the temperature of the oxidant entering the turbine.

To improve performance of the gas turbine, one or more regulators may be used to control various factors of the engine. For example, as the oxidant enters the compressor, the quantity and/or temperature of the oxidant can affect the power generated by the turbine. Accordingly, there is a need for better optimization of the gas turbine.

BRIEF DESCRIPTION

Certain embodiments commensurate in scope with the originally claimed disclosure are summarized below. These embodiments are not intended to limit the scope of the claimed disclosure, but rather these embodiments are intended only to provide a brief summary of possible forms of the disclosure. Indeed, the disclosure may encompass a variety of forms that may be similar to or different from the embodiments set forth below.

In a first embodiment, a system includes a control system for a gas turbine including a controller having a processor, wherein the processor is configured to access an operational parameter associated with the gas turbine, calculate a bias based on the operational parameter, wherein the bias indicates an amount of change in a temperature of an oxidant entering a compressor of the turbine to reach a reference temperature, and control the temperature of the oxidant based on the bias to improve power output of the gas turbine.

A second embodiment includes a non-transitory computer-readable medium having computer executable code stored thereon, the code having instructions to access an operational parameter associated with a gas turbine, calculate a bias based on the operational parameter, wherein the bias indicates an amount of change in a temperature of an oxidant entering a compressor of the turbine to reach a reference temperature, and control the temperature of the oxidant based on the bias to improve power output of the gas turbine.

In a third embodiment, a method for a gas turbine system includes accessing, via a processor, an operational parameter associated with the gas turbine, calculating, via the processor, a bias based on the operational parameter, wherein the bias indicates an amount of change in a temperature of an oxidant entering a compressor of the turbine to reach a reference temperature, and controlling, via the processor, the temperature of the oxidant based on the bias to improve power output of the gas turbine.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is directed towards a system and method to control inlet temperatures of a compressor on a gas turbine. The gas turbine may include an intercooler coupled between a low pressure compressor (LPC) and a high pressure compressor (HPC). Traditionally, it is believed that lower temperatures result in better operation of the gas turbine. However, at some point, further lowering temperatures of the oxidant can result in reduced performance. As such, it is desirable to control the inlet temperature of the oxidant as the oxidant enters a compressor to improve performance of the gas turbine engine. The system may include a controller for a gas turbine. The controller may be configured to calculate a bias for a regulator of the gas turbine. The controller may control, via the regulator, an inlet temperature of the gas turbine based on the bias. The inlet temperature may be the temperature of an oxidant as the oxidant enters a compressor of the gas turbine.

Figure 1:
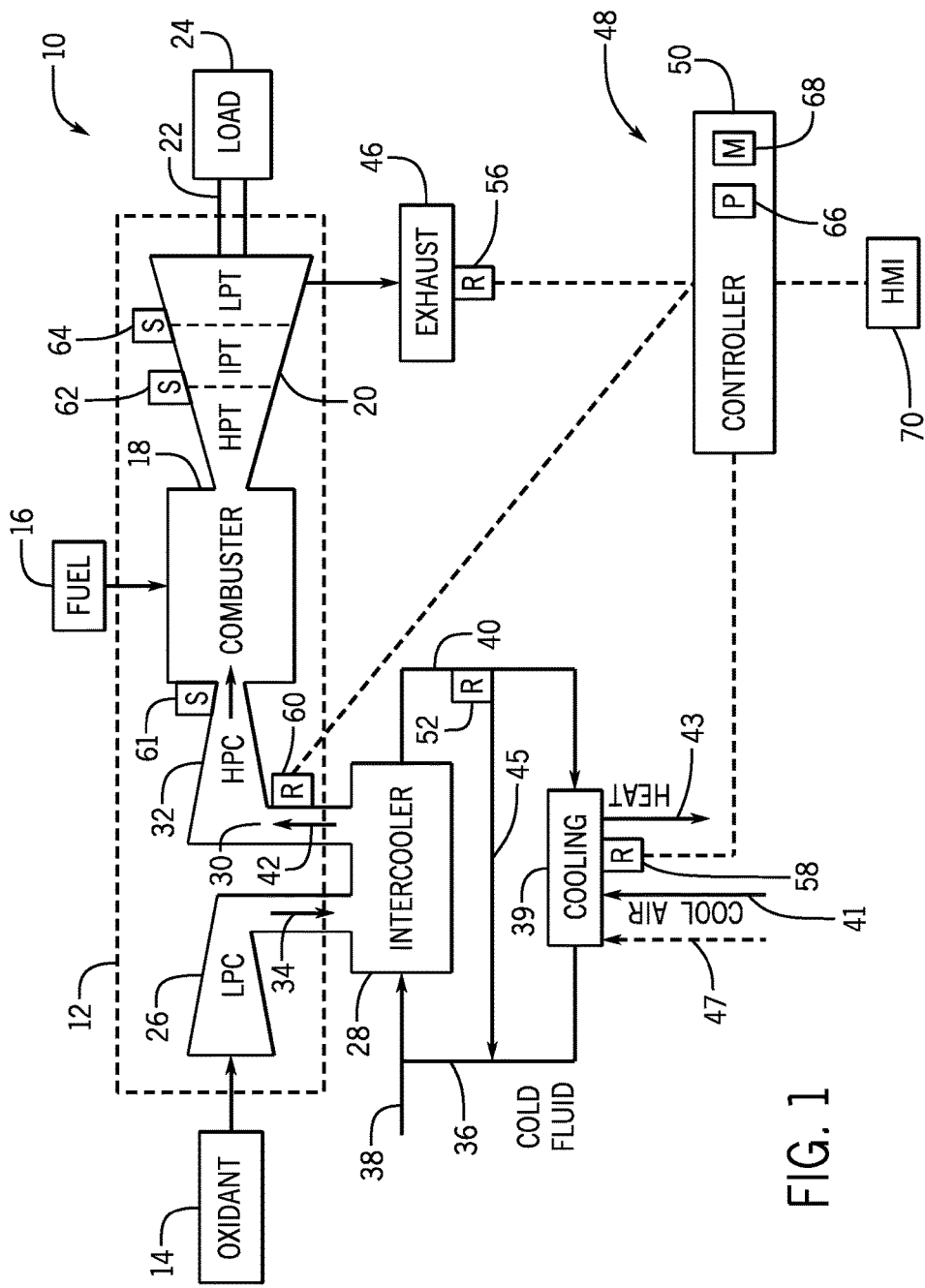
FIG. 1 is a schematic diagram of an embodiment of a power generation system having a controller that regulates an inlet temperature of an oxidant into a gas turbine of the power generation system.

Turning to the figures, FIG. 1 is a schematic diagram of an embodiment of a power generation system 10 that includes a gas turbine system 12. The gas turbine system 12 may receive an oxidant 14 (e.g., air, oxygen, oxygen-enriched air, or oxygen-reduced air) and a fuel 16 (e.g., gaseous or liquid fuel), such as natural gas, syngas, or petroleum distillates. The oxidant 14 may be pressurized and combined with the fuel 16 to be combusted in a combustor 18. The combusted oxidant may then be used to apply forces to blades of a turbine 20 to rotate a shaft 22 that provides power to a load 24.

The gas turbine system 12 may include one or more compressors that increase the pressure of the oxidant 14. As depicted in FIG. 1, the gas turbine system 12 includes a lower pressure compressor (LPC) 26 connected to an intercooler 28 to couple the lower pressure compressor 26 to an inlet 30 of a high pressure compressor (HPC) 32. The oxidant 14 enters the low pressure compressor 26 and is compressed into a compressed oxidant 34 (e.g., gas, liquid, or both). The compressed oxidant 34 may include a compressed gas (e.g., air, oxygen, oxygen-enriched air, or oxygen-reduced air), a lubricant (e.g., oil), a coolant fluid, or any combination thereof. In certain embodiments, the compressed oxidant 34 may include gas from exhaust gas recirculation (EGR). The compressed oxidant 34 then enters the intercooler 28.

The intercooler 28 may be any intercooler 28 suitable for cooling the compressed oxidant 34, such as a spray intercooler (SPRINT) or an efficient spray intercooler (ESPRINT). The intercooler 28 may cool the compressed oxidant 34 by using a fluid 36 to increase the efficiency of the gas turbine system 12. The intercooler 28 may be an indirect heat exchanger, such as a shell and tube heat exchanger, a plate and shell heat exchanger, or any arrangement of fluid conduits or passages that enables the flow of the compressed oxidant 34 in close proximity to the flow of fluid 36, thereby transferring heat from the compressed oxidant 34 to the fluid 36. For example, the fluid 36 may be directed from the low pressure compressor 26 of the gas turbine system 12 into an outer shell of the intercooler 28. Further, the compressed oxidant 34 routed to the outer shell of the intercooler 28 may exchange heat with the fluid 36 directed into a cooler inner tube of the intercooler 28. In this manner, the compressed heated oxidant 34 may be cooled to a cooler temperature than before the compressed oxidant 34 entered the intercooler 28. The cooled compressed oxidant 42 is then rerouted into the inlet 30 of the high pressure compressor 32 to be compressed, while the fluid 36 is heated (e.g., from the heat that was in the compressed oxidant 34) and exported from the intercooler 28 to be cooled at cooling block 39 that removes heat from the heated fluid 40.

The cooling block 39 may include a cooling bank of fans that cool the heated fluid 40. The cooling bank of fans may cool the heated fluid 40 with cool air 41, thereby allowing heat 43 to leave the heated fluid 40 to outside air, and the cooled fluid 36 may be cycled back to the intercooler 28. Additionally and/or alternatively, some fluid may be sent for cooling while other fluid may be sent back to the intercooler 28 via conduit 45. Further, additional fluid from the fluid supply 38 may be inserted into the intercooler 28.

The fluid supply 38 may include a variety of components for flow control, flow distribution, and fluid treatment. The fluid supply 38 may include a storage tank, a conduit, a freshwater source (e.g., a lake or river), a plant component (e.g., equipment in a power plant that provides a process fluid), a pump, a valve, a distribution manifold, a fluid treatment system (e.g., filter, solid-liquid separator, gas-liquid separator, and/or chemical absorber), or any combination thereof. The fluid 36 may include a liquid, a gas, or a combination thereof. For example, the fluid 36 may include water, a water chemical mixture, fresh water, process water from various sources in an industrial plant such as a power plant, or any combination thereof. While the fluid supply 38 is shown as being directed towards the intercooler 28, the fluid supply 38 may interact with the bank of cooling fans of the cooling block 39 before entering the intercooler 28 as denoted by reference number 47.

The compressed and cooled oxidant 42 is further compressed in the high pressure compressor 32 and combined with the fuel 16 into an oxidant-fuel mixture to be combusted in the combustor 18. As the oxidant-fuel mixture is combusted (e.g., burned and/or ignited), the oxidant-fuel mixture expands through one or more turbines 20. For example, embodiments may include a high pressure turbine (HPT), intermediate pressure turbine (IPT), and a low pressure turbine (LPT) as depicted in FIG. 1. In some embodiments, the system 10 may include HPT and LPT turbines. In other embodiments, there may be a single turbine, four, five, or more turbines. The turbine 20 may be coupled to a shaft 22 that is coupled to one or more loads 24. The turbine 20 may include one or more turbine blades that rotate causing the shaft 22 to provide rotational energy to the load 24. For example, the load 24 may include an electrical generator or a mechanical device in an industrial facility or power plant. The rotational energy of the shaft 22 may be used by the load 24 to generate electrical power. As the gas turbine system 12 generates power, the combusted oxidant-fuel mixture is expelled as an exhaust 46. The exhaust 46 may include one or more emissions, such as nitrogen oxides ($NO_x$), hydrocarbons (HC), carbon monoxide (CO) and/or other pollutants. The exhaust 46 may be treated in a variety of ways, such as with a catalyst system.

The power generation system 10 may also include a control system 48 to monitor and/or control various aspects of the gas turbine system 12, the load 24, and/or the intercooler 28. The control system 48 may include a controller 50 having inputs and/or outputs to receive and/or transmit signals to one or more regulators, sensors, or other controls to control the gas turbine system 12 and/or the intercooler 28. While some examples are illustrated in FIG. 1 and described below, these are merely examples and any suitable sensors and/or signals may be positioned on the gas turbine system 12, the load 24, and/or the intercooler 28 to detect operational parameters to control the power generation system 10 with the controller 50. For example, the controller 50 may send and/or receive a signal from one or more regulators 52 and 58 of the intercooler 28 to control quantity and/or temperature of the intercooler fluid 36. For example, regulator 52 may be a valve that controls the quantity of water that passes through conduit 45 versus the cooling block 39. Further, a regulator 58 may control a bank of cooling fans in the cooling block 39 to control the temperature of the cooled fluid 36 leaving the cooling block 39. Additionally and/or alternatively, the controller 50 may send and/or receive one or more signals from and/or to the regulator 60 to control the flow of the cooled and compressed oxidant 42 directed to the high pressure compressor 32. In an embodiment, the regulator 60 may be a bleed off valve that bleeds off compressed oxidant 42 to control the quantity and pressure of the compressed oxidant 42 entering the high pressure compressor 32. The regulator 60 may provide a quantity, temperature, and/or flow rate of the cooled and compressed oxidant 42 to the controller 50.

Further, the controller 50 may send and/or receive signals to or from sensors of the gas turbine system 12 related to various operating parameters of the compressors 26, 32, the combustor 18, the turbine 20, the shaft 22, and/or the load 24. For example, the controller 50 may send and/or receive a signal to or from one or more sensors 61, 62 and 64 to monitor temperatures, pressure, and/or flow of the oxidant-fuel mixture passing through the high pressure compressor 32, the combustor 18, or the one or more turbines 20. For example, a PS3 pressure regulator may regulate oxidant pressure as the cooled compressed oxidant 42 enters the combustor 18. As a further example, the controller 50 may receive signals from sensors 62 and 64 related to temperature of the air-fuel mixture as the mixture passes between the turbines 20. In an embodiment, the sensors may be exhaust gas turbine or power turbine inlet temperature regulators (e.g., T48), T25, and/or intermediate pressure turbine speed (e.g., N44) regulators.

The controller 50 may also send and/or receive signals from a regulator 56 that detects properties of the exhaust 40, such as an exhaust gas temperature (EGT). The regulator 56 may be a T48 regulator that controls one or more parts of the power generation system 10 to limit exhaust gas temperatures to an exhaust gas temperature (EGT) limit. The EGT limit may be associated with a threshold where the blades of the turbine 20 have an increased likelihood of heating beyond designed operating temperatures. As such, the controller 50 may be configured to limit the exhaust gas temperatures to protect the blades of the turbine 20 from overheating. For example, new engines may operate at an operating point away from (e.g., further in temperature than a threshold margin) the EGT limit. In other words, the temperature of the oxidant 42 entering the compressor 32 is cooled so that when the oxidant 42 passes through as exhaust 46, the exhaust temperature is lower than the EGT limit beyond a preset amount. As an engine deteriorates, the engine may be regulated by the EGT limit due to aging parts of the engine. When running with limited power (e.g., not a maximum power), deteriorated engines may operate away from the EGT limit.

The controller 50 may include a processor 66 or multiple processors, memory 68, and inputs and/or outputs to send and/or receive signals from the one or more sensors 61, 62, and 64 and/or regulators 52, 58, and 60. The processor 66 may be operatively coupled to the memory 68 to execute instructions for carrying out the presently disclosed techniques. These instructions may be encoded in programs or code stored in a tangible non-transitory computer-readable medium, such as the memory 68 and/or other storage. The processor 66 may be a general purpose processor, system-on-chip (SoC) device, or application-specific integrated circuit, or some other processor configuration. For example, the processor 66 may be part of an engine control unit that controls various aspects of the turbine system 12.

Memory 68 may include a computer readable medium, such as, without limitation, a hard disk drive, a solid state drive, a diskette, a flash drive, a compact disc, a digital video disc, random access memory (RAM), and/or any suitable storage device that enables processor 66 to store, retrieve, and/or execute instructions and/or data. Memory 68 may further include one or more local and/or remote storage devices. Further, the controller 50 may be operably connected to a human machine interface (HMI) 70 to allow an operator to read measurements, perform analysis, and/or adjust set points of operation.

The controller 50 may be programmed or configurable (e.g., performed via the processor 66 and the memory 68) to control the temperature of the oxidant 42 at the inlet 30 to the high pressure compressor 32 to increase power generated by the turbine system 12. The processor 66 may control the temperature of the oxidant 42 by controlling one or more operating parameters of the intercooler 28. For example, the processor 66 may send a signal to the regulator 52 to increase fluid through the conduit 45 to have less cooled fluid entering the intercooler 28. The warmer temperatures then decrease the change in temperature of the oxidant 42 exiting the intercooler 28. As another example, the processor 66 may control the temperature of the oxidant by sending a signal to decrease speed of fans in a bank of fans in the cooling block 39. By lowering the amount of cool air 41 entering and the amount of heat 43 leaving, less cooled fluid 36 may enter the intercooler 28 than if the processor 66 had not controlled the speed of the fans in the fan bank. As yet another example, the processor 66 may be configured to control the regulator 60 to bleed off compressed oxidant 42 to control the quantity and pressure of the compressed oxidant 42 entering the high pressure compressor 32, thereby altering temperatures generated in the combustor 18. While these examples are used with respect to having less cooled fluid 36, the process can be used to have colder fluid 36. For example, the processor 66 may send a signal to the regulator 52 to increase fluid entering the cooling bank 39, and/or the processor 66 may send a signal to the regulator 58 increase speeds of the fans in the fan bank of the cooling block 39. In this manner, the processor 66 can control the temperature of the oxidant 42 from the intercooler 28 at an inlet 30 of the high pressure compressor 32.

Figure 2:
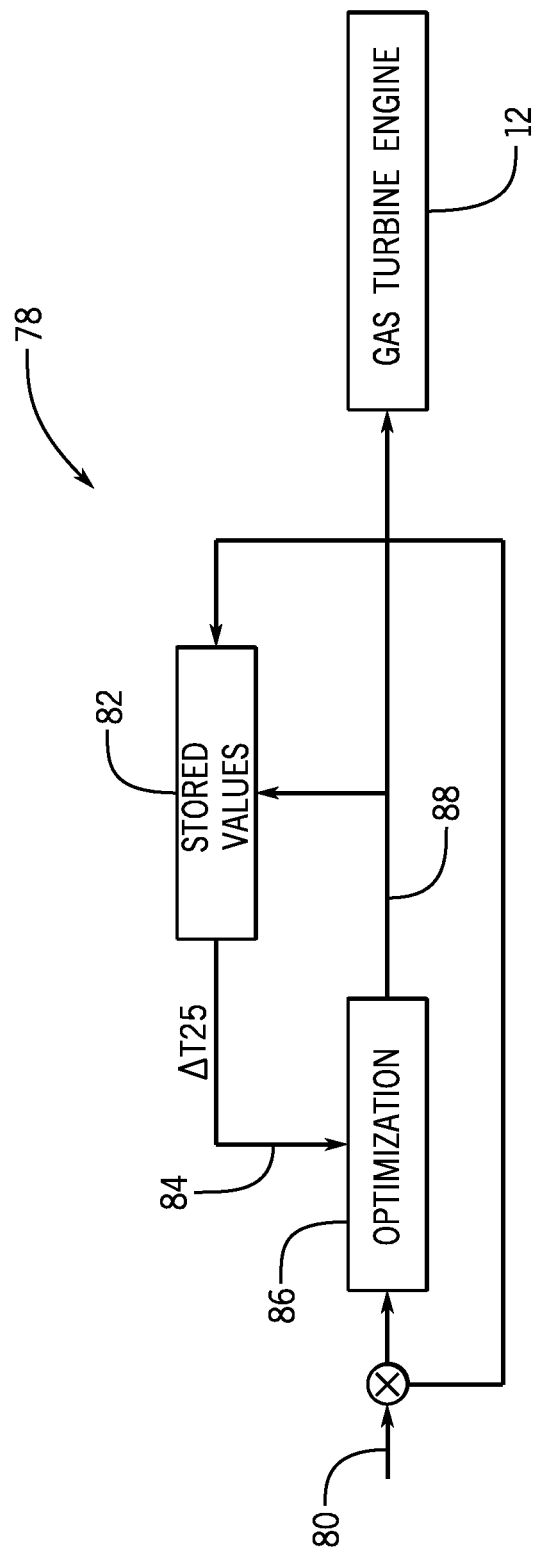
FIG. 2 is a block diagram of an embodiment of a process performed by the controller of FIG. 1.

The processor 66 may control the temperature based on the turbine temperatures and/or exhaust gas temperatures received by one or more regulators 56, 62, and 64 of the exhaust and/or turbine 20. FIG. 2 is a block diagram of an example of a process 78 of operations performed by the processor 66 of the controller 50 to control the inlet 30 temperature of the oxidant 42 from the intercooler 28. These operations may be implemented in software (e.g., code), hardware, or any combination thereof. The processor 66 may receive a signal indicating one or more operational parameters 80 of the power generation unit 10, such as a pressure, temperature, or flow of oxidant 14, fluid 36, fuel 16, exhaust 46, or the like from one of the regulators, sensors, or controls. For example, the one or more operational parameters 80 may include a pressure measurement from the pressure sensor 61 entering the combustor 18 or temperatures from the temperature sensors 62 and 64. Alternatively and/or additionally, the one or more operational parameters 80 may include the exhaust gas temperature measurement of the exhaust 46.

In some embodiments, the operational parameter 80 used as the input to the process 78 may depend on which regulator the turbine system 12 is currently operating on. For example, the operational parameter 80 may be pressure and/or temperature when the turbine 20 is currently operating on an exhaust gas turbine or power turbine inlet temperature regulators (e.g., T48), T25, an intermediate pressure turbine speed (e.g., N44) regulators, and/or an HPC exhaust pressure (e.g., PS3) regulator. The operational parameter 80 values may be stored as a stored value 82 in the memory 68. The stored values 82 may be stored pressures, temperatures, flow rates, speeds, or any suitable value for determining aspects related to performance of the gas turbine system 12. The stored values 82 may be used in models, statistics, or other empirical data to determine how to optimize inlet temperatures of the oxidant 42.

The one or more operational parameters 80 and/or other stored values 82 may then be used to calculate a bias 84 that indicates how much to change temperature of the cooled oxidant 42 entering the inlet 30 of the of the high pressure compressor 32. The processor 66 may determine how much to change the oxidant temperature based on oxidant temperatures corresponding to exhaust gas temperatures and/or turbine temperatures. In other words, to output the desired exhaust gas temperatures versus measured exhaust gas temperatures, the processor 66 may determine a desired oxidant temperature to adjust current oxidant 42 temperatures. The bias 84 indicates the change between the desired oxidant 42 temperature and the current oxidant 42 temperature to generate the desired exhaust gas temperatures from the measured EGT values. Further, the stored values 82 may also include ambient temperatures and/or pressures that are accounted for when determining the bias 84. The increased temperatures of the high pressure compressor 32 may cause exhaust gas temperatures to operate within a margin of the exhaust gas temperature limit. By calculating the bias 84 based on exhaust gas temperatures of the turbine 12, the bias 84 can compensate for ambient temperature changes, engine variation, and deterioration of the turbine 12. For example, if ambient temperatures drop, the exhaust gas temperatures may drop as well. The processor 66 may receive a signal from the regulator 56 indicating the drop in exhaust gas temperatures (e.g., the one or more operational parameters 80 of FIG. 2). The processor 66 may then determine the bias indicating how much to change temperature of the cooled oxidant 42. The processor 66 may control the regulator 52 and/or the regulator 58 to adjust the temperature of the fluid 36 interacting with the oxidant 42 such that the oxidant 42 approaches the desired temperature for the oxidant 42. In this example, the processor 66 may send a signal to reduce power used by the cooling fans of the cooling block 39, thereby saving power of the intercooler 28 and improving power output of the gas turbine system 12.

The processor 66 may generate an optimized bias 88 that indicates an updated temperature difference from the previous bias 84. That is, the optimized bias 88 may be limited within one or more limits by the optimization 86 circuitry. By controlling the inlet temperatures based on the exhaust gas temperature, power output of the gas turbine increases. That is, by controlling the optimized bias 88 such that the exhaust gas temperatures operate within one or more thresholds (e.g., margins) of the exhaust gas temperature limit, the optimized bias 88 may improve power output of the gas turbine system 12. For example, the processor 66 may cap the bias 84 such that the optimized bias 88 controls exhaust gas temperatures of the turbine 12 to operate within a 0.1-5 degree Celsius margin (e.g., 1.6 degree Celsius margin) of the exhaust gas temperature limit. As another example, the optimized 88 may be rate limited to a preset threshold of degrees per second, such as 0.01 to 0.1 degrees Celsius per second (e.g., 0.055 degrees Celsius/sec). Further, the optimized bias 88 may have an upper limit threshold to prevent overheating. For instance, the optimized bias 88 may be limited to 40-50 degrees Celsius (e.g., 46 degrees Celsius). As yet another example, the optimized bias 88 may not operate when temperatures are lower than 15-25 degrees Celsius (e.g., 21 degrees Celsius). This limit may have a hysteresis to avoid cycling in the intercooler 28. One or more of these limits and/or thresholds (e.g., degrees per second and/or degrees) may be adjustable by an operator via the HMI 70. Further, the logic of the process 78 may be enabled and disabled via the HMI 70. In some embodiments, the bias may be applied only when the engine 12 is operating on an exhaust gas turbine or power turbine inlet temperature regulators (e.g., T48), a T25 regulator, an intermediate pressure turbine speed (e.g., N44) regulators, and/or an HPC exhaust pressure regulator, such as a PS3 pressure regulator.

While exhaust gas temperature is used as the operational parameter 80 above, exhaust gas temperature is merely used as an example, and other operational parameters 80 may be used to control the bias 84 during operation of the turbine system 12 to improve power output. For example, the gas turbine system 12 may be operating on a PS3 pressure regulator as the sensor 61, such that the PS3 pressure regulator is controlling and/or limiting the power output. This may occur, for example, when pressure entering the combustor 18 is a limiting factor of power output more than exhaust gas temperatures. When the system 12 is operating on the PS3 pressure regulator, the oxidant 42 return set point may be controlled based on the PS3 pressure. That is, the inlet temperature of the oxidant 42 may be controlled by the bias 88 where the bias 88 is calculated based on the pressures of the PS3 regulator.

The processor 66 may receive one or more criteria (e.g., via the HMI 70) related to plant operations. For instance, if a plant places a higher priority on water temperature (e.g., lower water temperatures are associated with higher costs), the processor 66 may modify the algorithm that controls a balance of plant (BOP). The BOP system may determine water flow and water temperature adjustments based on the inlet temperature set point. If, for example, water temperature is given a higher priority, the system may use more water to achieve similar inlet temperatures based on the bias 84. That is, the processor 66 may send a signal to the regulator 52 to allow more of the fluid 36 to flow through the cooling block 39. Alternatively, if water flow is given a higher priority, the BOP system may decrease the temperature of water used to obtain the desired inlet temperatures to save in overall water consumption. In other words, the processor 66 may increase the speed of the fans in the fan bank to increase the cooling performed by the cooling block 39.

Figure 3:
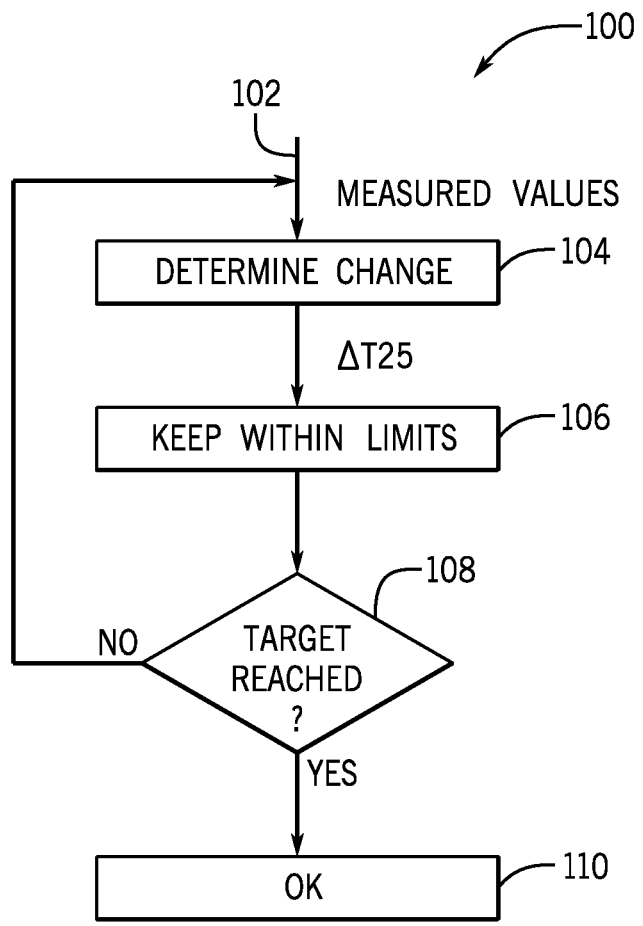
FIG. 3 is a flow diagram of an embodiment of a process performed by the controller of FIG. 1.

The processor 66 may be configured to control the inlet temperature based on the optimized bias 88. FIG. 3 is a flow chart of a process 100 performed by the processor 66 (e.g., running code) to cause the inlet temperature to be controlled. The process 100 may be stored in the memory 68 of the controller 50 and executed as instructions by the processor 66. The processor 66 may begin by receiving one or more measured operational parameter values (block 102). As mentioned above, these measured values may be temperatures, pressures, oxidant flow, fluid flow, or the like. The processor 66 may continue by determining a change or bias 84 (block 104) to the inlet temperature set point (e.g., air return set point from the intercooler 28). The processor 66 may limit the bias 84 (block 106) to be within a limited range of values. These limits prevent the inlet temperature from exceeding certain temperature or pressure thresholds of the turbine 12, such as the EGT limit or change in temperature limits. The processor 66 may then determine whether the target value for the inlet temperature has been reached (block 108). For example, the processor 66 may receive exhaust gas temperature measurements and determine whether the exhaust gas temperatures match the EGT limit. If the target value has not been reached (e.g., due to the one or more limits), then the processor 66 may begin again by receiving updated measured values (block 102). If the target has been reached, the processor 100 may maintain the inlet temperature, via the regulator 52 and/or 58, at the current setting (block 110).

Technical effects of the present embodiments may include controlling inlet temperatures of a turbine. In certain embodiments, a controller may receive one or more operational parameters of a turbine, such as an exhaust gas temperature, oxidant pressure, or the like. A processor of the controller may use the operational parameter to generate a bias for an inlet temperature of the turbine. Technical effects of the present embodiments may include controlling the temperature of oxidants entering an inlet of a compressor. In this way, the turbine can generate additional power due to the controlled temperature entering the compressor.

This written description uses examples to disclose the embodiments, including the best mode, and also to enable any person skilled in the art to practice the embodiments, including making and using any devices or systems and performing any incorporated methods. The patentable scope of the present disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A control system for a gas turbine, comprising:
a controller comprising a processor, wherein the processor is configured to:
access an operational parameter associated with the gas turbine;
calculate a bias based on the operational parameter, wherein the bias indicates an amount of change in a temperature of an oxidant entering a compressor of the turbine to reach a reference temperature; and
control the temperature of the oxidant based on the bias by adjusting temperature of a fluid that interacts with the oxidant in an intercooler, by adjusting a quantity of fluid that interacts with the oxidant in the intercooler, or any combination thereof, to improve power output of the gas turbine.

2. The control system of claim 1, wherein the processor is configured to allow the temperature of the oxidant to increase based on the bias.

3. The control system of claim 1, wherein the controller is configured to calculate the bias based at least in part on an exhaust gas temperature (EGT) as the operational parameter.

4. The control system of claim 1, wherein the controller is configured to control the temperature of the oxidant such that an EGT is within a margin of an EGT limit.

5. The control system of claim 4, wherein the controller is configured to adjust the margin based on a received amount to account for the type or age of gas turbine.

6. The control system of claim 1, wherein the controller is configured to control the temperature of the oxidant by adjusting speed of fans in a cooling block.

7. The control system of claim 1, wherein the controller is configured to control the bias based at least in part on stored values in a memory of the controller.

8. A non-transitory computer-readable medium having computer executable code stored thereon, the code comprising instructions to:
access an operational parameter associated with a gas turbine;
calculate a bias based on the operational parameter, wherein the bias indicates an amount of change in a temperature of an oxidant entering a compressor of the turbine to reach a reference temperature; and
control the temperature of the oxidant based on the bias by adjusting a temperature of a fluid that interacts with the oxidant in an intercooler, by adjusting a quantity of the fluid that interacts with the oxidant in the intercooler, or any combination thereof, to improve power output of the gas turbine.

9. The non-transitory computer-readable medium of claim 8, wherein the code comprises instructions to limit the temperature to a temperature limit to protect blades of the gas turbine.

10. The non-transitory computer-readable medium of claim 8, wherein the code comprises instructions to control the temperature of the oxidant when ambient temperatures exceed a preset threshold temperature.

11. The non-transitory computer-readable medium of claim 8, comprising instructions to enable or disable temperature control of the oxidant by an operator.

12. The non-transitory computer-readable medium of claim 8, wherein the instructions are configured to control the temperature of the oxidant based on a plant priority, wherein the plant priority allows for prioritizing water flow or water temperature of an intercooler of the gas turbine.

13. The non-transitory computer-readable medium of claim 8, wherein the code comprises instructions to calculate the bias based at least in part on an exhaust gas temperature (EGT) as the operational parameter.

14. The non-transitory computer-readable medium of claim 8, wherein the code comprises instructions to adjust a speed of a fan in a cooling block that cools the fluid.

15. A method for a gas turbine system, comprising:
accessing, via a processor, an operational parameter associated with the gas turbine;
calculating, via the processor, a bias based on the operational parameter, wherein the bias indicates an amount of change in a temperature of an oxidant entering a compressor of the turbine to reach a reference temperature; and
controlling, via the processor, the temperature of the oxidant based on the bias by adjusting a temperature of a fluid that interacts with the oxidant in an intercooler, by adjusting a quantity of the fluid that interacts with the oxidant in the intercooler, or any combination thereof, to improve power output of the gas turbine.

16. The method of claim 15, comprising limiting the temperature to a preset threshold to protect blades of the gas turbine.

17. The method of claim 15, wherein the bias is capped in view of an exhaust gas temperature threshold to prevent the temperature of the oxidant from exceeding the exhaust gas temperature threshold.

18. The method of claim 15, comprising limiting a change in value of the bias to a preset threshold of degrees per second to prevent rapid fluctuations in the temperature of the oxidant.

19. The method of claim 15, comprising adjusting a speed of a fan in a cooling block that cools the fluid.

20. The method of claim 15, comprising calculating the bias based at least in part on an exhaust gas temperature (EGT) as the operational parameter.

* * * * *